Feb. 23, 1926.
J. HEMJE
1,574,732
ATTACHMENT FOR ADJUSTING THE FENDERS OF LISTER CULTIVATORS
Filed April 30, 1925
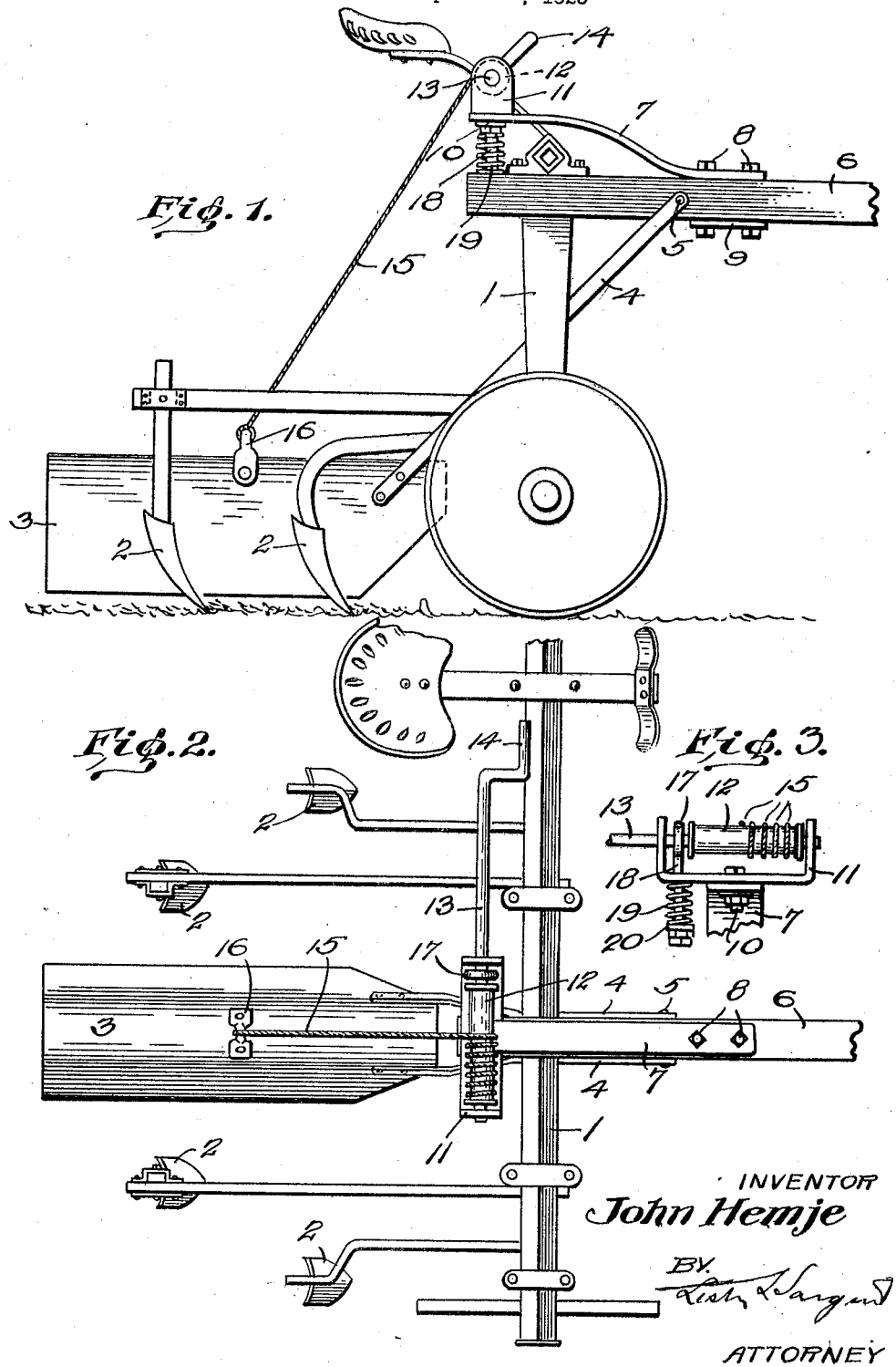
INVENTOR
John Hemje
BY
ATTORNEY Patented Feb. 23, 1926.

1,574,732

UNITED STATES PATENT OFFICE.

JOHN HEMJE, OF HILDRETH, NEBRASKA.

ATTACHMENT FOR ADJUSTING THE FENDERS OF LISTER CULTIVATORS.

Application filed April 30, 1925. Serial No. 26,940.

*To all whom it may concern:*

Be it known that I, JOHN HEMJE, a citizen of the United States, residing at Hildreth, in the county of Franklin and State of Nebraska, have invented a new and useful Attachment for Adjusting the Fenders of Lister Cultivators, of which the following is a specification.

The object of my invention is to provide a novel and conveniently operated device for raising and lowering the fender of a lister cultivator and to provide the novel combination and arrangement of parts disclosed in the accompanying drawings, in which—

Figure 1 is a side elevation of a portion of a lister cultivator showing my device attached to it, Fig. 2 is a top plan of same; and Fig. 3 is a detail view of the drum bracket showing the brake.

Like numerals indicate like parts in each of the several views.

Referring to the accompanying drawings, 1 represents the frame of a lister cultivator, having the usual cultivator blades 2 and carrying the fender 3 which is attached to beams 4, which beams are fulcrumed on the bolts 5 on member 6 of the cultivator frame. I provide a bracket 7 secured by bolts 8 to member 6, the bolts engaging a wear plate 9, as shown in Fig. 1. I provide a yoke member 11 attached by bolt 10 to the free end of bracket 7. A rod 13 is mounted in the upturned ends of yoke member 11, which extends transversely of the frame of the cultivator and at one end terminates in a crank 14, while the other end carries the drum 12 to which is attached the cable 15, which cable is attached also by eye 16 to the fender 3. I provide a stem 18 having an eye member 17 at its upper end and having lock nuts 20 at its lower end. I provide a spring 19 interposed between the lock nuts 20 and the bight portion of the yoke 11 whereby tension is adjustably exerted on the rod 13 in order to control the speed or retard the unwinding of the drum 12. The operation of the invention will be obvious from the accompanying drawings. The crank 14 is arranged in a position convenient to the driver of the implement, as shown in Fig. 2, who may raise the fender by turning the crank and thus winding the cable 15 on the drum 12.

What I claim is:

An attachment for adjusting the fender of a lister cultivator, comprising a rod having a crank provided on one end thereof, a yoke in which said rod is rotatably mounted, a drum mounted on the rod, a fender pivotally attached to the frame of the cultivator, a cable having one end attached to the drum, a brake member comprising an eye engaging the rod on which the drum is mounted, a depending stem, lock nuts on the outer end of said stem, and a spring interposed between the lock nuts and the bight portion of the yoke on which the rod is mounted, whereby the tension of the drum may be adjusted by adjusting the lock nuts.

JOHN HEMJE.